Feb. 9, 1943.  D. R. SHOULTS ET AL  2,310,713
CONTROL SYSTEM
Filed Dec. 17, 1940   2 Sheets-Sheet 1

Inventors:
David R. Shoults,
Albert P. Mansfield,
by Harry E. Dunham
Their Attorney.

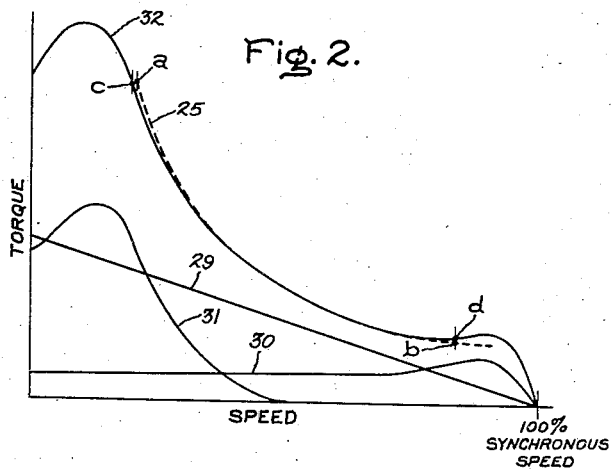
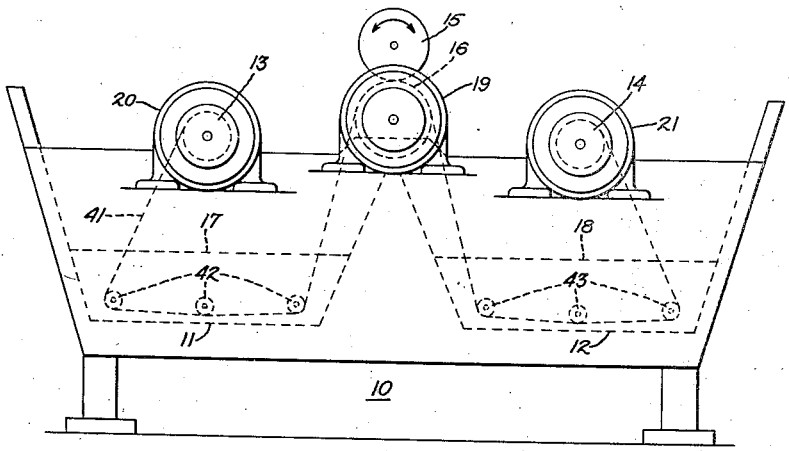

Patented Feb. 9, 1943

2,310,713

UNITED STATES PATENT OFFICE 2,310,713

CONTROL SYSTEM

David R. Shoults and Albert P. Mansfield, Schenectady, N. Y., assignors to General Electric Company, a corporation of New York Application December 17, 1940, Serial No. 370,490

20 Claims. (Cl. 242—75)

This invention relates to control systems, more particularly to systems for controlling the operation of reeling apparatus having a pair of reels one of which acts as a paying out reel from which a length of material is unwound, and the other of which acts as a takeup reel upon which the material is rewound, and it has for an object the provision of a simple, reliable, inexpensive, and improved control system of this character. Such a control system may be employed on an apparatus for performing some operation or carrying out some process on a length of material. For example, it may be applied to a cloth dyeing apparatus in which the cloth is unwound from a supply reel, passed through a dye bath, and rewound on a takeup reel.

In carrying the invention into effect in one form thereof, an induction motor having a polyphase primary and a polyphase secondary winding is mechanically coupled to one of the reels and a similar induction motor is mechanically coupled to the other reel. One of the motors is energized from a source of alternating current so that it operates as a motor and drives its reel to wind the material thereon as it is unwound from the supply reel. A polyphase impedance network is connected in the secondary circuit of the winding reel motor to cause it to operate at substantially constant power output throughout a substantial speed range so as to maintain constant tension in the material as the diameter of the roll increases. Means are provided for controlling the motor which is coupled to the unwinding reel so that it operates as a braking generator driven by the material at constant power output thereby to maintain constant tension in the material as the diameter of the unwinding reel decreases. In one modification, direct current is supplied to the unwinding reel motor to cause it to operate as a constant power output generator throughout a substantial speed range and in another modification, the primary winding of the unwinding reel motor is connected to a polyphase source so that the rotor is rotated by the unwinding reel in a direction which is opposite to the phase rotation of the primary winding, and a polyphase resistance-reactance network is connected in the circuit of the secondary winding.

In order that the operation may be reversed, a master switch is provided for causing the motors to reverse their duties.

Figure 1:
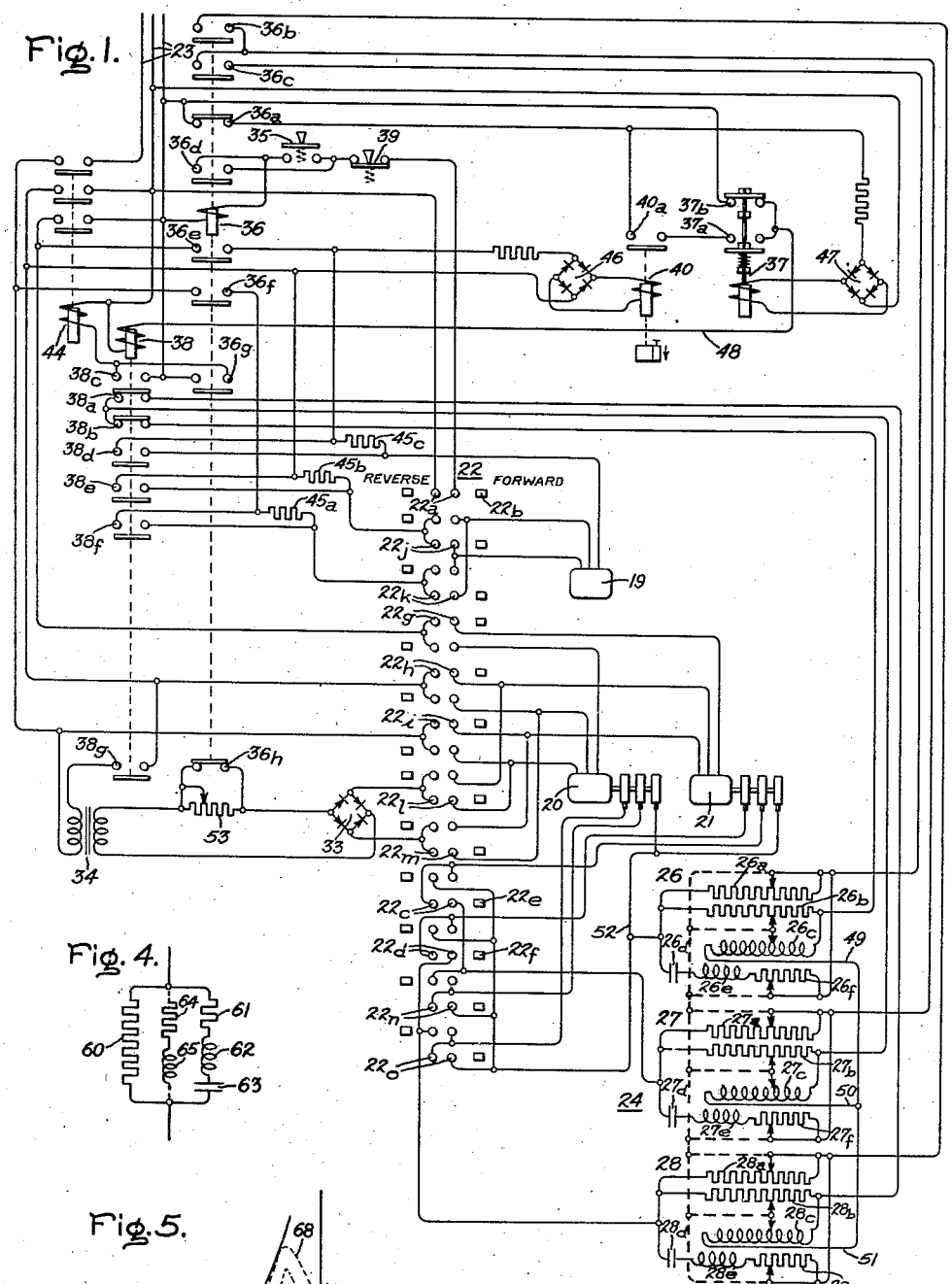
Figure 4:
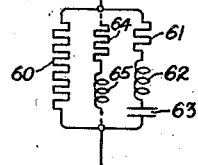
Figure 5:
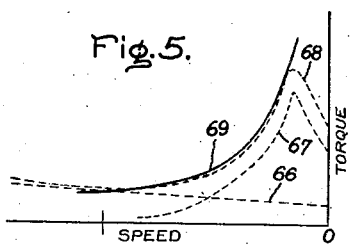

For a better and more complete understanding of the invention, reference should now be had to the following specification and to the accompanying drawings of which Fig. 1 is a simple diagrammatical sketch of an embodiment of the invention, Fig. 2 is a chart of characteristic curves which facilitate an understanding of the theory and operation of the invention, Fig. 3 is a simple diagrammatical sketch illustrating an application of the invention to a cloth dyeing apparatus, Fig. 4 is a detail of a modification of the system of Fig. 1, and Fig. 5 is a chart of characteristic curves illustrating the operation of the modification.

Although the invention is illustrated as being applied to a cloth dyeing apparatus, it will be understood that the invention has other applications.

Referring now to the drawings, a dyeing jig 10 having a plurality of compartments indicated by the dotted lines 11, 12 is provided with a pair of reels 13 and 14 and a pair of nip rolls 15 and 16. The compartments indicated by the dotted lines 11 and 12 are filled with a dyeing solution approximately to the levels that are indicated by the dotted lines 17 and 18.

The nip rolls 15 and 16 are driven by a suitable electric motor 19. This motor is illustrated as an alternating current squirrel cage induction motor. Preferably, the shaft of the motor is direct connected to the shaft of one of the rolls. A pair of wound rotor induction motors 20 and 21, having polyphase primary and secondary windings, are mechanically coupled to the shafts of the reels 13 and 14, respectively. Preferably the shafts of these motors are directly coupled to the shafts of the reels.

Usually several passes of the cloth through the dye bath are required in order to obtain the desired shade and the proper degree of dyeing. During one pass of the reel motors will operate as a motor to drive its reel and wind the cloth thereon, and the other reel motor will act as a braking generator driven by the material to hold back on the material and apply a braking torque thereto so as to produce a tension in the material between the unwinding reel and the nip rolls. During the succeeding pass it is necessary for the reel motors to reverse their duties and for this purpose, a reversing type master switch 22 is provided.

During a pass of the material through the dye bath, the nip roll motor 19 drives the nip rolls 15, 16 to advance the material at constant speed in the proper direction and during the succeeding pass the nip roll motor 19 must rotate in the reverse direction so as to advance the material in the opposite direction from that of the preceding pass. In order to accomplish this reversal of direction of rotation of the nip roll motor, the master switch 22 is provided with additional reversing contacts for reversing the connections of the motor 19 to the supply source 23.

The diameters of the drums of the reels 13 and 14 may be any suitable amount, such for example, as five inches, and the diameter of a full roll of cloth which is placed on one of the drums may be as much as thirty inches. This requires that the motors 20 and 21 operate through a 6:1 speed range if the cloth is to be advanced through the dye bath at constant tension and constant linear speed.

In order to maintain constant tension in the cloth between the nip rolls 15, 16 and the winding up reel when the cloth is being advanced at constant linear speed, it is necessary that the winding reel motor operate at substantially constant power output throughout a substantial portion of its speed range, and similarly, in order that the tension in the cloth between the unwinding reel and the nip rolls shall be maintained constant when the cloth is being advanced at constant linear speed through the dye bath, it is necessary that the unwinding reel motor operate as a braking generator at constant power output. Since a wound rotor induction motor does not have a constant power output characteristic, it is necessary to modify the secondary circuit of the motor in order to provide the desired constant power output characteristic. This is accomplished by means of a resistance-reactance network 24 which is arranged to be connected in the secondary circuit of the wound rotor induction motor which is operating as a motor during a pass to drive the winding reel.

When the desired torque characteristic is determined from a consideration of the range of diameters and the amount of friction present in the machine, the electrical constants of the separate elements of the secondary network 24 can be calculated so that the torque speed curves of the motor will follow very closely the desired torque speed characteristic.

In general, the desired speed torque characteristic of a motor which is to operate at constant power output is of the nature of a hyperbola, such for example as the portion of the curve 25 between the points $a$ and $b$ in Fig. 2 in which abscissae represent speed and ordinates represent torque. As is well known, this speed torque characteristic represents constant, horsepower. This characteristic can be approximated very closely with the three-branch network circuit 24 illustrated in Fig. 1.

This network comprises three separate parallel branches for each phase of the secondary circuit of the motor, and the phase groups 26, 27, and 28 are illustrated as being Y-connected although they might equally as well be connected in delta. The phase group 26 of the network 24 comprises a resistance branch consisting of a resistance 26a, a resistance-reactance branch comprising a resistor 26b and an inductance 26c, and another resistance-reactance branch including a capacitor 26d, an inductance 26e, and a resistor 26f. As indicated in the drawing, the parallel branches of this phase group are separately adjustable; the mechanical means for effecting these adjustments being indicated by the dotted lines attached to the movable adjusting contacts. The phase groups 27 and 28 of the network are identical with the phase group 26 and accordingly, a description of these two phase groups is unnecessary. The important effect that each of the parallel branches of the separate phase groups produces is indicated in the chart of characteristic curves in Fig. 2. The torque component produced by the resistance branches 26a, 27a, and 28a of the network is represented very closely by the straight line 29 passing through zero torque at synchronous speed, and through a maximum torque value at zero speed. In other words, the torque produced by the resistance branches of the network is proportional to the slip.

The resistance inductance branches 26b, 26c; 27b, 27c; 28b, 28c produce a torque component such as represented by the curve 30 which is obtained by proportioning the resistances and inductances so that the maximum torque produced by these branches of the network occurs at approximately 85 to 90 per cent of synchronous speed. As a result a considerable amount of additional torque at speeds near synchronous speed is obtained without producing too great an amount of additional torque at lower speeds. The practical result of this is that the machine may be geared to operate as high as 90 per cent synchronous speed at the minimum roll diameter and still maintain the proper torque relationship.

The capacitance - inductance - resistance branches of the network produce a torque component such as represented by the curve 31 of Fig. 2. As indicated, this brings about a considerable increase in the torque as the speed drops below 50 per cent speed and the roll diameter increases to the maximum. The reactance and capacitance of these branches of the network are so proportioned that they are in resonance in their series circuit at secondary frequencies occurring at or near standstill. Under this condition, these branches allow a considerable amount of secondary current to flow at low speed but practically none at speeds above 50 per cent of synchronous speed. The resistance in these branches of the network brings about a considerable amount of secondary loss at low speed and as the torque is proportional to the secondary loss at a given speed the desired torque component at low speed is obtained. The resultant or total torque of the motor is the sum of the separate torque components represented by the curves 29, 30 and 31 and this total or resultant torque of the motor is represented by the curve 32. It will be noted that the portion of the curve 32 between the points $c$ and $d$ approximates very closely the portion of the ideal or desired torque curve 25 between the points $a$ and $b$. Thus, the secondary resistant-reactance network 24 produces operation of one or the other of the wound rotor induction motors 20 and 21 at approximately constant power output over a very considerable speed range from very low speed to approximately 90 per cent of synchronous speed.

The motor which is coupled to the reel from which material is being unwound during a pass is caused to operate as a braking generator driven by the material at constant power output by supplying direct current to its primary windings. Since the reactance of the motor increases in proportion to the frequency of the induced secondary current and therefore in proportion to the speed of the motor, the torque decreases as the speed increases. Consequently, by supplying direct current to the primary winding of the motor it operates as a braking generator driven by the material at substantially constant power output, i. e., its torque varies inversely with speed.

For the purpose of supplying direct current to the unwinding reel motor, a rectifier 33 is connected across the secondary winding of a transformer 34 the primary winding of which is supplied from one phase of the source 23. Although any suitable type of rectifier may be used, it is preferred to use a rectifier of the surface contact type, such for example as the well known copper oxide rectifier.

A starting control device illustrated as a push-button type switch 35 having normally open contacts is provided together with an electromagnetically actuated contactor 36 controlled thereby for connecting the nip roll motor 19 and the induction motor which is to act as winding reel motor during a particular pass to the alternating current source 23 and for completing the supply of direct current to the induction motor which is to operate as a braking generator during that particular pass.

In order that the tension in the material between the unwinding reel and the nip roll shall not exceed a maximum permissible value during acceleration, the application of direct current to the motor coupled to the unwinding reel is delayed for a predetermined interval of time after the operation of the start button 35 by a suitable time element device illustrated as a magnetic time delay relay 37 arranged for time delay dropout together with a contactor 38 under the control of time delay relay 37. For the purpose of providing sufficient torque for accelerating the machine the reactance portions 26c, 27c and 28c of the resistance-reactance branches of the secondary network are short circuited by means of contacts 38a and 38b of contactor 38 during the accelerating period.

A stop control device illustrated as a push-button type switch 39 having normally closed contacts is provided for deenergizing the control apparatus and stopping the drive. When a stop is to be made, it is desirable to deenergize the nip roll motor 19 immediately, and to maintain the braking excitation of the unwinding reel motor for a short period of time during the decelerating period. It is also desirable to maintain a relatively small amount of energization of the winding reel motor and to this end the secondary circuit is modified so that the winding reel motor exerts a greatly reduced amount of torque as the machine coasts to rest. For the purpose of maintaining the direct current excitation of the unwinding reel motor, and the reduced excitation of the winding reel motor for a predetermined interval of time after the operation of the stop control device 39, time delay relay 40 is provided.

With the foregoing understanding of the elements and their organization in the completed system, the operation of the system itself will readily be understood from the following detailed description.

The tension of the material between the nip rolls 15 and 16 and the winding reel may be adjusted by adjustment of the movable contacts on the parallel branches of the phases 26, 27 and 28 of the impedance network.

The magnitude of the tension between the nip rolls and the winding reel is also determined by the magnitude of the voltage applied to the primary winding of the winding reel motor. This applied voltage may be adjusted by means of the tap switches on an autotransformer (not shown) which is connected between the contacts 22g, 22h and 22i of the master switch 22 and the three supply lines 23 from which the winding reel motor is supplied. Thus as an alternative method adjustment of the tension to suit the cloth and the dyeing requirements may readily be made by adjustment of these tap switches to adjust the voltage applied to the winding reel motor to the value which produces the desired value of tension.

It may be assumed that the reel 13 has a full roll of cloth and that the reel 14 is empty. The machine has previously been threaded so that the cloth 41 extends downwardly from the reel 13 into the dye bath and then beneath the guide rolls 42 and upwardly out of the bath and between the nip rolls 15 and 16 and then downwardly again into the dye bath in the second compartment and beneath the guide rolls 43 and thence upwardly out of the bath to the reel 14. During the ensuing pass, the reel motor 21 is to operate as a motor and the reel motor 20 is to operate as a braking generator. Accordingly, the master switch 22 is operated to the forward position in which circuits are prepared for operation of motor 21 as a motor, operation of motor 20 as a braking generator and operation of nip roll motor 19 in the proper direction to unwind cloth from the unwinding reel 13 and to deliver it to the winding reel 14.

To start the winding operation, the start button 35 is depressed to close its normally open contacts and to complete an energizing circuit for the operating coil of contactor 36. This circuit is readily traced from the right-hand supply line 23 through the operating coil of contactor 36, contacts of the push-button switch bridged by the movable contact member 35, normally closed contacts of stop-button 39, contacts 22a of the selector switch closed by the cam 22b and thence to the middle line of the source 23. Prior to the operation of the starting push-button 35, the operating coil of time delay relay 37 was connected to the right-hand and middle supply line 23 through the normally closed contacts 36a of contactor 36, and consequently the operating coil of relay 37 is energized and the relay is picked up with the result that when the start push-button 35 was depressed, the lower contacts 37a of relay 37 were bridged by their cooperating movable contact member and the normally closed upper contacts 37b were open. Contactor 36 picks up in response to energization of its operating coil and closes its normally open contacts 36b, 36c, 36d, 36e, 36f, 36g, and opens its normally closed contacts 36a and 36h. In the closed position of contacts 36d, a sealing-in circuit for the operating coil of contactor 36 is established in parallel with the contacts of start push-button 35 which may now be released. Contacts 36b and 36c when closed establish a Y point for the resistance branches 26a, 27a and 28a, and the capacitance, inductance and resistance branches of the phase units of the secondary networks. These phase units are connected in the secondary circuit of the induction motor 21 by means of contacts 22c and 22d which are closed by means of cams 22e and 22f respectively. As previously pointed out, the normally closed contacts 38a and 38b of contactor 38 short circuit the inductances 26c, 27c and 28c during the accelerating period to provide the increase in the torque of motor 21 necessary to accelerate the apparatus.

In the closed position of contacts 36g, an energizing circuit is established for the operating coil of contactor 44 across the middle and right-hand sides of supply source 23 and as a result contactor 44 closes its contacts to connect the primary winding of motor 21 to the supply source 23 through the contacts 22g, 22h and 22i of the master switch which are closed by their actuating cams. Contactor 44 in closing also connects the primary windings of nip roll motor 19 to the supply source 23 through contacts 22j and 22k of the master switch, resistors 45a, 45b and 45c and contacts 36e and 36f of contactor 36. The resistors 45a, 45b and 45c in circuit with the nip roll motor 19 limit its acceleration to a maximum permissible rate. Contactor 44 in closing also connects the rectifier 46 from which the operating coil of contactor 40 is supplied across the middle and right hand sides of the supply source 23 and as a result time delay contactor 40 immediately picks up and closes its contacts.

When contactor 36 opened its normally closed contacts 36a it disconnected the rectifier 47 which supplies direct current to the operating coil of time delay relay 37 from the supply source 23, and after a predetermined interval of time, time delay relay 37 drops out to open its lower contact 37a and to close its upper contacts 37b. Contacts 37b in closing complete an energizing circuit for the operating coil of contactor 38 which is traced from the right-hand supply line of source 23 through contacts 37b, conductor 48, operating coil of contactor 38 to the middle supply line 23. As a result of its energization, contactor 38 picks up and closes its normally open contacts 38c, 38d, 38e, 38f and 38g and opens its normally closed contacts 38a and 38b. Contacts 38c in the closed position complete a locking circuit for the operating coil of contactor 44 in parallel with contacts 36g so that contactor 44 will remain picked up after contactor 36 drops out as long as contactor 38 remains picked up. Contacts 38a and 38b in opening remove the short circuit from the reactances 26c, 27c, and 28c of the resistance inductance branches of the secondary network and the Y point for these branches is now established by the junction point of the conductors 49, 50 and 51. As a result of this, the torque of the winding reel motor 21 is reduced to its normal operating value since the accelerating period is now over and it is no longer necessary to have a high torque for accelerating purposes. Contacts 38d, 38e and 38f in their closed position short circuit the resistors 45a, 45b and 45c in the circuit of the nip roll motor 19 and thereby increase its torque and contacts 38g in the closed position connect the primary winding of the transformer 34 to the supply source 23 to complete the supply of direct current from rectifier 33 through contacts 22l and 22m of the master switch to the unwinding reel motor 20. Since the Y point is established for the secondary circuit of unwinding reel motor 20 by means of conductor 52 and contacts 22n and 22o of the master switch, motor 20 now operates as a generator driven by the cloth and thus produces a tension in the cloth between the unwinding reel 13 and the nip rolls 15 and 16. The amount of this tension is adjusted by means of an adjustable resistor 53 which is in circuit with the rectifier 33 when the contacts 36h of contactor 36 open.

From this point in the operation, the winding reel motor 21 operates at constant power output in accordance with the speed torque characteristic represented by curve 32 of Fig. 2 thereby to maintain constant tension in the cloth between the nip rolls 15 and 16 and the winding reel 14.

The machine is stopped before the cloth is completely unwound from the unwinding reel 13 by depressing the stop button 39 to open its contacts to interrupt the energizing circuit for the operating coil of contactor 36. Contactor 36 is dropped out in response to deenergization and opens its normally open contacts and closes its normally closed contacts. Contact 36a in opening deenergizes the operating coil of time delay relay 40 which, however, remains picked up for a predetermined interval of time and then drops out to open its contacts 40a. Contacts 36a in closing again connects the rectifier 47 to the supply source 23 and thus completes the supply of direct current to the operating coil of time delay relay 37 whose contacts are arranged to overlap when the relay picks up, i. e., the lower contacts 37a close before the upper contacts 37b open and thus contactor 38 remains picked up during the time interval required for time delay relay 40 to time out and open its contacts. Contacts 36e and 36f in opening disconnect the nip roll motor 19 from the supply source 23 and as a result, the machine begins to decelerate to rest. Contacts 36b and 36c, in opening, open the Y point for a portion of the secondary network 24. However, the Y point established by the junction point of the conductors 49, 50 and 51 is not opened and consequently the resistance and inductance branch of the network remains effective in the secondary circuit of the winding reel motor 21 so that the winding reel motor exerts only a very slight torque as the machine coasts to rest. Contacts 36h in closing short circuit the resistor 53 and thereby increase the braking torque of the unwinding reel motor 20 which is operating as a generator and thus maintains tension in the cloth during the decelerating period. After the expiration of the interval of time required for relay 40 to drop out and open its contacts, contactor 38 is deenergized and drops out to close its normally closed contacts and open its normally open contacts. Contacts 38a and 38b in closing short circuit the inductances 26c, 27c and 28c of the secondary network and thus leave the network in a reset condition for insertion in the secondary circuit of the reel motor which is to drive the winding reel during the next pass. Contacts 38d, 38e and 38f in opening reinsert the resistances 45a, 45b, 44 and 45c in the primary circuit of the nip roll motor 19 and thus this motor is left in a reset condition for starting the next pass. Contact 38c in opening interrupts the energizing circuit for the operating coil of contactor 44 and as a result of its deenergization, contactor 44 opens its contacts and disconnects the winding reel motor 21 from the supply source 23. Contacts 38g in opening disconnect the transformer 34 from the supply source 23 and thereby interrupt the supply of direct current to the unwinding reel motor 20. During the time interval required for the machine to decelerate to rest, following the operation of the stop button 39 to disconnect the nip roll motor 19 from the source, the winding reel motor 21 is maintained slightly energized and the unwinding reel motor 20 is maintained energized by direct current, and thus tension is maintained in the cloth until the machine is actually brought to rest.

For the succeeding pass in the reverse direction, the master switch 22 is operated to the left to the reverse position. The effect of this operation is to transfer the resistance-reactance network 24 to the secondary circuit of the induction motor 20 which is to operate as winding reel motor during the succeeding pass and to connect the rectifier 33 to the primary of the induction motor 21 which is to operate as a braking generator driven by the cloth during the succeeding pass. Also the master switch partially completes the connection from the nip roll motor 19 to the source 23 for operation in the reverse direction during the succeeding pass.

To start the succeeding pass, it is then only necessary to depress the start button 35 and the operation described in the foregoing is repeated with the exception that the pass is performed in the reverse direction.

Instead of supplying direct current to the unwinding reel motor, operation as a generator at constant power output to produce the desired variable braking torque may be provided by connecting a polyphase resistance-reactance network, one phase of which is shown in Fig. 4, in the secondary circuit of the unwinding reel motor and connecting the primary winding to the supply source so that the primary phase rotation, i. e. the direction of rotation of the rotating magnetic field of the primary winding, is opposite to the direction in which the motor is driven by the unwinding reel. Under these conditions, the unwinding reel motor will regenerate and return energy to the source to produce a braking torque in accordance with the characteristic curves shown in Fig. 5 in which abscissae represent speed and ordinates represent torque.

Each of the three phases of the secondary network for the unwinding reel motor will have a resistance branch comprising a resistor 60, and a parallel resistance-reactance branch comprising a resistor 61, an inductance 62 and a capacitor 63 and for certain operating conditions, a third parallel branch comprising a resistor 64 and an inductance 65. However, since this third branch will not be required for all conditions, its connections to the other branches are shown in dotted lines.

The three phases may be connected in Y or delta as desired. From the foregoing it will be seen that the network for the unwinding reel motor is generally similar to the network 26 for the winding reel motor. However, owing to the rotation of the rotor in a direction opposite to the primary phase rotation, the frequency of the voltage induced in the secondary winding of the unwinding reel motor increases with speed instead of decreasing as in the case of the winding reel motor. Because of this the electrical constants of the network for the unwinding reel motor must be different from those of the network 26 in order to produce the desired speed torque characteristic. The torque component produced by the resistor branch 60 of each phase of the network increases with speed as illustrated by the dotted curve 66 of Fig. 5. The resistor 61, inductance 62 and capacitor 63 are so proportioned that resonance in their series circuit occurs near standstill, and a torque component is produced such as represented by dotted curve 67. The constants of both branches must be so proportioned that when the torque components represented by curves 66 and 67 are added to each other, the resultant speed-torque characteristic represented by dotted curve 68 will closely approximate the desired speed-torque characteristic represented by full line curve 69 throughout a wide range of speeds of the unwinding reel motor.

In this modification, the rectifier 33, transformer 34 and connections for supplying direct current through the master switch 22 to the unwinding reel motor, and the contacts of the master switch will be modified to transfer the impedance network of Fig. 4 from the secondary circuit of the unwinding reel motor to the secondary circuit of the other motor in the same manner that the master switch transfers the network 24 from the secondary circuit of the winding reel motor to the secondary circuit of the other motor at the end of each pass.

Although in accordance with the provisions of the patent statutes this invention is described as embodied in concrete form and the principle thereof has been described together with the best mode in which it is now contemplated applying that principle, it will be understood that the elements and apparatus shown and described are merely illustrative, and that the invention is not limited thereto since alterations and modifications will readily suggest themselves to persons skilled in the art without departing from the true spirit of the invention or from the scope of the annexed claims.

What we claim as new and desire to secure by Letters Patent of the United States is:

1. A control system for apparatus for unwinding material from a reel and winding the material on another reel comprising in combination, an unwinding reel, a winding reel, an induction machine having polyphase primary and secondary windings mechanically coupled to each of said reels, a polyphase resistance-reactance network connected in the secondary circuit of the winding reel machine to control said machine to operate as a motor at constant power output throughout a substantial speed range to drive the winding reel, and means for controlling said unwinding reel machine to operate as a generator driven by said unwinding reel at constant power output thereby to maintain the tension of said material substantially constant.

2. A control system for apparatus for transferring material from one reel to another comprising in combination, an unwinding reel, a winding reel, a wound rotor induction motor having polyphase primary and secondary windings mechanically connected to said winding reel, a second wound rotor induction motor mechanically connected to said unwinding reel, a polyphase resistance-reactance network connected in the secondary circuit of said winding reel motor to control said motor to operate at constant power output to drive said winding reel, means for controlling said unwinding reel motor to operate as a generator driven by said unwinding reel at constant power output, a starting control device and means controlled thereby for connecting said winding reel motor to a source of supply, means for rendering a portion of said network ineffective when said winding reel motor is connected to said source thereby to increase the accelerating torque of said winding reel motor, and time element means for rendering said portion of said network effective an interval of time after the operation of said starting device.

3. A control system for material reeling apparatus having an unwinding reel and a winding reel, an induction motor mechanically coupled to said winding reel, a second induction motor mechanically coupled to said unwinding reel, a resistance-reactance network connected in the secondary circuit of said winding reel motor to effect operation thereof as a motor at constant power output, said network comprising a resistance branch for producing a torque component having a substantial value at zero speed and decreasing substantially linearly with speed, a resistance-reactance branch for producing a torque component having a relatively low value at low speeds and a relatively high value at high subsynchronous speeds and a resistance-reactance branch for producing a torque component having a relatively high value at low speed and a relatively low value at high subsynchronous speeds, and means for controlling said unwinding reel motor to effect operation thereof as a braking generator driven by the material at constant power output.

4. A control system for material reeling apparatus comprising in combination an unwinding reel, a winding reel, a wound rotor induction motor mechanically coupled to the winding reel and a second wound rotor induction motor mechanically coupled to the unwinding reel, a resistance-reactance network connected in the secondary circuit of said winding reel motor whereby the horsepower output of said motor is maintained substantially constant throughout a substantial speed range of said motor, and means for supplying a direct current to said unwinding reel motor so that said motor operates as a generator with a constant horsepower output throughout a substantial speed range thereby to maintain constant tension in the material.

5. A control system for apparatus having a pair of rolls for operating on a length of material, comprising a reel for feeding a length of material to said rolls, a reel for winding the material delivered by said rolls, a polyphase wound rotor induction motor mechanically coupled to said winding reel, a second polyphase wound rotor induction motor mechanically coupled to said unwinding reel, a resistance-reactance network connected in the secondary circuit of said winding reel motor for causing said winding reel motor to operate at constant horsepower throughout a substantial speed range thereby to maintain constant tension in the material between said rolls and said winding reel, and means for supplying direct current to one of the windings of said unwinding reel motor to cause said unwinding reel motor to operate as a generator driven by the material at constant horsepower throughout a wide speed range thereby to maintain constant tension in the material between said unwinding reel and said rolls as the diameter of the material on the unwinding reel decreases.

6. A control system for apparatus having a pair of rolls for operation on a length of material, comprising an unwinding reel for supplying material to said rolls, a reel for winding the material delivered from said rolls, a wound rotor induction motor mechanically coupled to said winding reel, a second wound rotor induction motor mechanically coupled to said unwinding reel, a resistance-reactance network connected in the secondary circuit of said winding reel motor to cause said winding reel motor to operate at constant horsepower throughout a substantial speed range to maintain constant tension in said material between said rolls and said winding reel, means for supplying direct current to said unwinding reel-motor to effect operation thereof as a generator driven by the material at constant horsepower to maintain constant tension in the material between said rolls and said unwinding reel, a starting device, means responsive to operation of said starting device for connecting said winding reel motor to a source of supply with a portion of said network ineffective, and means for rendering said portion of said network effective after an interval of time.

7. A control system for material reeling apparatus comprising a winding reel, an unwinding reel, a wound rotor induction motor mechanically connected to said winding reel, a second wound rotor induction motor mechanically coupled to said unwinding reel, a resistance-reactance network connected in the secondary circuit of said winding reel motor so that said winding reel motor is caused to operate at constant power output to maintain constant tension in the material, a starting control device and means controlled thereby for connecting said winding reel motor to a source of supply, means for short circuiting a portion of said network when said winding reel motor is connected to said source to increase the accelerating torque of said winding reel motor, and means responsive to said operation of said starting device for interrupting the short circuit about said portion of said network an interval of time after the operation of said starting device.

8. A control system for material reeling apparatus comprising an unwinding reel, a winding reel, a wound rotor induction motor mechanically coupled to said winding reel motor, a second wound rotor induction motor mechanically coupled to said unwinding reel, a resistance-reactance network connected in the secondary circuit of said winding reel motor for effecting operation of said winding reel motor at constant power output, means for supplying direct current to said unwinding reel motor to effect operation thereof as a generator driven by the material at constant power output, a starting control device and means responsive to operation thereof for connecting said winding reel motor to a source of supply, means for rendering a portion of said network ineffective when said winding reel motor is connected to said source to increase the accelerating torque of said winding reel motor, and time element means responsive to operation of said starting device for rendering said portion of said network effective and connecting said unwinding reel motor to a source of direct current an interval of time after the operation of said starting device.

9. A control system for material reeling apparatus comprising an unwinding reel, a winding reel, a wound rotor induction motor mechanically coupled to the winding reel, a second wound rotor induction motor mechanically coupled to the unwinding reel, a resistance-reactance network connected in the secondary circuit of the winding reel motor to cause said winding reel motor to operate at constant power output, a starting control device and means responsive to operation thereof for connecting said winding reel motor to a source of supply, and a time element device set in operation in response to said operation of said starting control device for completing the supply of direct current to said unwinding reel motor to effect operation of said winding reel motor as a braking generator driven by the material at constant power output an interval of time after said operation of said starting device.

10. A control system comprising in combination, an element operating on a length of material, an unwinding reel for supplying material to said element, a reel for winding material delivered from said element, a motor for driving said element, a wound rotor induction motor mechanically coupled to said winding reel, a second wound rotor induction motor mechanically coupled to said unwinding reel, a current controlling impedance connected in the secondary circuit of said winding reel motor for effecting operation at constant power output to maintain constant tension in the material between said element and said winding reel, a starting device and means controlled thereby for connecting said element driving motor and said winding reel motor to a source of supply, time element means responsive to operation of said starting device for completing a supply of direct current to said unwinding reel motor an interval of time after operation of said starting device to effect operation of said unwinding reel motor as a braking generator driven by said material at constant power output, a stop control device, means controlled by said stop control device for disconnecting said element driving motor from said source, and time element means responsive to operation of said stop control device for disconnecting said winding reel motor from said source and interrupting the supply of direct current to said unwinding reel motor an interval of time after the operation of said stopping device.

11. A control system comprising an element for operating on a length of material, an unwinding reel for supplying material to such element and a reel for winding material delivered from said element, a motor for driving said element, a wound rotor induction motor mechanically coupled to said winding reel, a second wound rotor induction motor mechanically coupled to said unwinding reel, means for connecting said winding reel motor and said element driving motor to a source of supply, means for supplying direct current to said unwinding reel motor to effect operation thereof as a braking generator driven by the material at constant power output, a stop control device and means controlled thereby for disconnecting said element driving motor from said source, and time element means responsive to operation of said stop control device for disconnecting said winding reel motor from said source and interrupting the supply of direct current to said unwinding reel motor an interval of time after the operation of said stop control device.

12. A control system comprising an element operating on a length of material, an unwinding reel for delivering material to said element, a reel for winding material delivered from said element, a motor for driving said element, a wound rotor induction motor mechanically coupled to said winding reel, a second wound rotor induction motor mechanically coupled to said unwinding reel, a current limiting impedance connected in the secondary circuit of said winding reel motor to effect operation at constant power output, means for connecting said element driving motor and said winding reel motor to a source of supply, means for completing the supply of direct current to said unwinding reel motor to effect operation thereof as a braking generator driven by the material at constant power output, a stopping control device and means responsive to operation thereof for disconnecting said element driving motor from said source and for varying said impedance to decrease the torque of said winding reel motor, a time element device responsive to operation of said stopping control device for disconnecting said winding reel motor from said source and interrupting said supply of direct current a predetermined interval of time after operation of said stopping control device.

13. A control system comprising an element operating on a length of material, a pair of reels operatively associated with said element, a motor connected to drive said element, a first induction motor mechanically coupled to one of said reels, a second induction motor mechanically coupled to the other of said reels, an impedance arranged to be connected in the circuit of one of said induction motors to effect operation thereof at constant power output, and a reversing type master switch operable to a first position to energize said element driving motor and the first of said induction motors, to connect said impedance in circuit with said energized induction motor and to complete a supply of direct current to the second of said induction motors and operable to a second position to energize said element driving motor for rotation in the reverse direction and said second induction motor, to connect said impedance in the circuit of the second induction motor and to complete the supply of direct current to said first motor so that during one pass of said material said first induction motor operates as a motor to drive its reel and said second induction motor operates as a braking generator driven by the material and during the next pass said second motor operates as a motor to drive its reel and said second motor operates as a braking generator driven by the material.

14. A control system for material reeling apparatus comprising a pair of reels, a first wound rotor induction motor mechanically coupled to one of said reels, a second wound rotor induction motor mechanically coupled to the other of said reels, an impedance adapted to be connected in the secondary circuit of said motors to effect operation thereof at constant power output when operating as a motor, means for supplying direct current to said motors to effect operation at constant power output, when operating as a generator, a reversing type master switch for energizing said first motor with said impedance in its secondary circuit to effect operation as a motor to drive its reel to wind said material and to complete the supply of direct current to said second motor to effect operation as a generator driven by said material and operable to a second position to energize said second motor with said impedance in its secondary circuit to effect operation as a motor to drive its reel to wind said material and to complete the supply of direct current to said first motor to effect operation as a generator driven by said material.

15. A control system for material reeling apparatus comprising an unwinding reel, a winding reel, an induction motor mechanically coupled to said winding reel, a second induction motor mechanically coupled to said unwinding reel, a resistance-reactance network connected in the secondary circuit of said winding reel motor to effect operation thereof as a motor at constant power output, said network comprising a resistance branch for producing a torque component having a substantial value at zero speed and decreasing substantially linearly with speed, a resistance-reactance branch for producing a torque component having a relatively low value at low speeds and a relatively high value at high subsynchronous speeds and a resistance-reactance branch for producing a torque component having a relatively high value at low speed and a relatively low value at high subsynchronous speeds, and means for supplying direct current to said unwinding reel motor to effect operation thereof as a braking generator driven by the material at constant power output.

16. A control system for material reeling apparatus comprising an unwinding reel, a winding reel, an induction motor mechanically coupled to said winding reel, a second induction motor mechanically coupled to said unwinding reel, a resistance-reactance network connected in the secondary circuit of said winding reel motor to effect operation thereof as a motor at constant power output, said network comprising a branch comprising a resistance for producing a torque component having a relatively high value at zero speed and decreasing substantially linearly with speed, a parallel branch comprising a resistance and an inductive reactance connected in series relationship for producing a torque component having a relatively low value at low speed and a substantially higher value at high subsynchronous speeds and a third parallel branch comprising a resistance, a capacitor and an inductive reactance connected in series relationship for producing a torque component having a relatively high value at low speeds and a relatively low value at high subsynchronous speeds, and means for supplying direct current to said unwinding reel motor to effect operation thereof as a braking generator driven by the material at constant power.

17. A control system for material reeling apparatus comprising an unwinding reel, a winding reel, an induction motor mechanically coupled to said winding reel, a second induction motor mechanically coupled to said unwinding reel, a plurality of resistance-reactance networks, each of said networks being connected in one of the legs of the secondary circuit of said winding reel motor to effect operation thereof as a motor at constant power output, each of said networks comprising a resistance branch for producing a torque component having a substantial value at zero speed and decreasing substantially linearly with speed, a resistance-reactance branch for producing a torque component having a relatively low value at low speeds and a relatively high value at high subsynchronous speeds and a resistance-reactance branch for producing a torque component having a relatively high value at low speed and a relatively low value at high subsynchronous speeds, and means for supplying direct current to said unwinding reel motor to effect operation thereof as a braking generator driven by the material at constant power output.

18. A control system for apparatus for transferring material from one reel to another comprising an unwinding reel, a winding reel, a wound rotor induction machine mechanically connected to said winding reel, a second wound rotor induction machine mechanically connected to said unwinding reel, said machines having polyphase primary and secondary windings, means for connecting the primary windings of said machines to a source so that one of said machines operates as a motor to drive said winding reel and the other of said machines operates as a generator driven by the unwinding reel in a direction opposite to the phase rotation of the primary winding, and a polyphase reactance-resistance network connected in the secondary circuit of each of said machines to effect operation thereof at constant power output through a substantial speed range thereby to maintain constant tension in the material.

19. A control system for apparatus for transferring material from one reel to another comprising an unwinding reel, a winding reel, a wound rotor induction machine mechanically connected to said winding reel, a second wound rotor induction machine mechanically connected to said unwinding reel, said machines having polyphase primary and secondary windings, a starting control device and means controlled thereby for connecting the primary windings of said machines to a source so that one of said machines operates as a motor to drive said winding reel and the other of said machines operates as a generator driven by the unwinding reel in a direction opposite to the phase rotation of the primary winding, a polyphase reactance-resistance network connected in the secondary circuit of each of said machines to effect operation thereof at constant power output through a substantial speed range thereby to maintain constant tension in the material, means for rendering a portion of said network of said winding reel machine ineffective when said winding reel machine is connected to said source thereby to increase the accelerating torque of said winding reel machine, and time element means for rendering said portion of said network effective an interval of time after the operation of said starting device.

20. A control system for apparatus for transferring material from one reel to another comprising an unwinding reel, a winding reel, a wound rotor induction machine mechanically connected to said winding reel, a second wound rotor induction machine mechanically connected to said unwinding reel, said machines having polyphase primary and secondary windings, means for connecting the primary windings of said machines to a source so that one of said machines operates as a motor to drive said winding reel and the other of said machines operates as a generator driven by the unwinding reel in a direction opposite to the phase rotation of the primary winding, and a polyphase reactance-resistance network connected in the secondary circuit of each of said machines to effect operation thereof at constant power output through a substantial speed range thereby to maintain constant tension in the material, the network of said unwinding reel machine comprising a resistance branch for producing a torque component having a relatively low value at zero speed and increasing substantially linearly with speed, and a resistance-reactance branch for producing a torque component having a relatively high value at low speeds and a relatively low value at high speed.

DAVID R. SHOULTS.
ALBERT P. MANSFIELD.